United States Patent [19]

Ogawa et al.

[11] Patent Number: 4,766,524
[45] Date of Patent: Aug. 23, 1988

[54] BACK LIGHT DEVICE FOR UNIFORMLY ILLUMINATING A LIQUID CRYSTAL DISPLAY PLATE

[75] Inventors: Soichiro Ogawa, Tokyo; Toshihiko Sano; Takao Shimizu, both of Ome, all of Japan

[73] Assignee: Hitachi, Ltd., Tokyo, Japan

[21] Appl. No.: 12,172

[22] Filed: Feb. 9, 1987

[30] Foreign Application Priority Data

Feb. 7, 1986 [JP] Japan .................................. 61-23773
Nov. 17, 1986 [JP] Japan .................................. 61-271694

[51] Int. Cl.⁴ .......................................... G01D 11/28
[52] U.S. Cl. .................................... 362/29; 362/216; 362/260
[58] Field of Search .................. 362/29, 30, 97, 223, 362/216, 260

[56] References Cited

U.S. PATENT DOCUMENTS

| | | | |
|---|---|---|---|
| 3,890,777 | 6/1975 | Stanish | 362/29 |
| 3,920,311 | 11/1975 | Tsuda et al. | 362/297 |
| 4,184,194 | 1/1980 | Shofu | 362/260 |
| 4,382,272 | 4/1983 | Quella et al. | 362/260 |
| 4,425,604 | 1/1984 | Imai et al. | 362/307 |
| 4,510,560 | 4/1985 | Negishi | 362/299 |
| 4,528,617 | 7/1985 | Blackington | 362/32 |
| 4,564,890 | 1/1986 | Poyer | 362/260 |
| 4,642,736 | 2/1987 | Masuzawa et al. | 362/328 |
| 4,648,690 | 3/1987 | Ohe | 362/26 |
| 4,656,561 | 4/1987 | Shinbo et al. | 362/30 |

FOREIGN PATENT DOCUMENTS 60-75910 5/1985 Japan .
2123540 2/1984 United Kingdom .............. 362/260

Primary Examiner—Charles J. Myhre
Assistant Examiner—David A. Okonsky
Attorney, Agent, or Firm—Antonelli, Terry & Wands

[57] ABSTRACT

A back light device for uniformly illuminating a liquid crystal display plate comprises a fluorescent lamp having a luminous tube formed by being turned up through a coupling in the same plane, a liquid crystal display plate to be illuminated by the light radiated from the fluorescent lamp, a diffused plate interposed between the liquid crystal display plate and the fluorescent lamp in parallel to the plane, and a reflector for reflecting the light radiated from the fluorescent lamp toward the diffused plate.

8 Claims, 2 Drawing Sheets

BACK LIGHT DEVICE FOR UNIFORMLY ILLUMINATING A LIQUID CRYSTAL DISPLAY PLATE

BACKGROUND OF THE INVENTION

The present invention relates to a back light device for uniformly illuminating a liquid crystal display plate, or more in particular to a fluorescent lamp back light device using a fluorescent lamp, in which the luminance of the liquid crystal display plate is improved without any unevenness even for an increased size of the liquid crystal display plate.

In the case where a straight-tube fluorescent lamp is used as a back light source in the back of a liquid crystal display plate, the luminance, which is high on the surface of the liquid display plate nearer to the tube part of the fluorescent lamp, progressively deteriorates toward the parts of the liquid crystal display screen away from the tube, thereby causing what is called a luminance unevenness on the surface of the liquid crystal display plate. In order to obviate this luminance unevenness, as disclosed in JP-A-No. 60-75910(U), a shade plate for removing the luminance unevenness is interposed between the fluorescent lamp and the liquid crystal display plate, so that the light emitted from the fluorescent lamp is transmitted through the shade plate thereby to reduce the luminance unevenness on the surface of the liquid crystal display plate.

In the prior art described above, the shade plate for removing the luminance unevenness interposed between the fluorescent lamp and the liquid crystal display plate causes the reflection and absorption of light thereon, thereby reducing the luminance on the surface of the liquid crystal display plate as a whole. Also, the provision of the shade plate undesirably increases the number of parts required.

Further, if the luminance is to be improved by providing a plurality of straight-tube fluorescent lamps, a proportionately increased number of light circuits are required which is accompanied by an undesirable increased cost of the device.

SUMMARY OF THE INVENTION

Accordingly, it is an object of the present invention to provide a display device using a fluorescent lamp in which the luminance unevenness on the display plate surface is reduced without reducing the luminance.

In order to achieve this object, there is provided according to the present invention a back light device comprising a fluorescent lamp as a back light source having a luminous tube of such a shape as turned up through a coupling in the same plane.

According to a preferable embodiment of the present invention, the above-mentioned object is achieved by using as a back light source, say, a U-shaped fluorescent lamp having two straight tube parts connected mutually by a bending part or a coupling in the same plane.

According to a more preferable embodiment for achieving the object mentioned above, the center distance of the straight tube parts is set to 0.3 to 0.7 times of the width of the display plate surface for carrying the light source.

DESCRIPTION OF THE PREFERRED EMBODIMENTS

Figure 1:
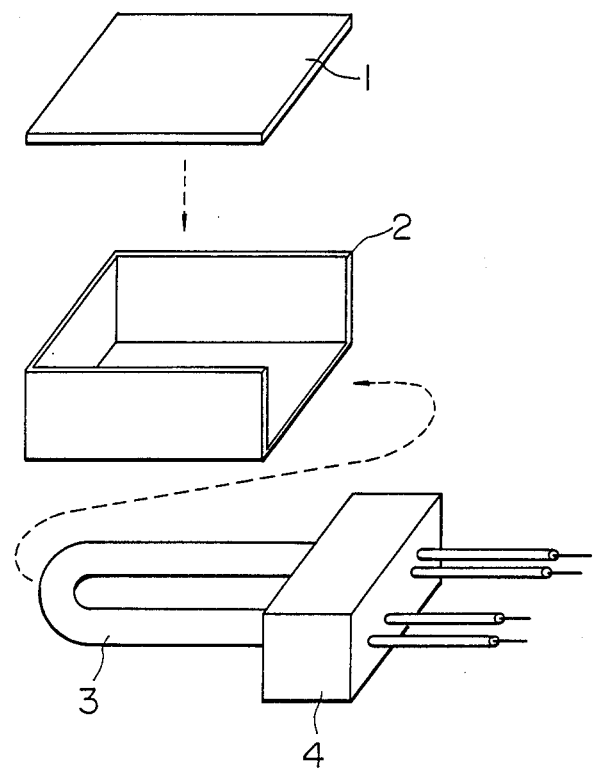
FIG. 1 is a diagram showing an exploded view of a back light device for uniformly illuminating a liquid crystal display plate according to the present invention.

The operating principle of the present invention will be explained first.

A fundamental approach to the present invention is based on the idea that there must be only one fluorescent lamp included in the device, and on the basis of this concept, various shapes of the fluorescent lamp have been considered to obtain a high luminance without considerable luminance unevenness and taking the convenience of replacement into consideration. Conceivable shapes were U, V, W, double V, triple U, etc. each of which could be regarded as two, four or six lamps and with a lamp input terminal only on one side, could be easily replaced.

All other equivalent shapes that cannot be expressed in words have the same effect.

An S-shaped lamp, however, has input terminals on both sides and therefore fails to meet the single-input requirement.

All of the shapes mentioned above require only one lamp-lighting unit and are much less costlier than a multi-lamp lighting unit.

Specifically, by the shape of a fluorescent lamp into S, U, V, W or the like, the advantage is obtained that the luminous length is lengthened greatly without changing the lamp tube diameter or space. A longer luminous length leads to a proportionately larger average luminance on the surface of a back light. Also, the shape of U, W or the like increases the apparent number of lamps to two or four respectively as viewed from the liquid crystal display plate, and improves the otherwise-lowest luminance of the four corners of the liquid crystal display screen, thus reducing the luminance unevenness at the same time.

Further, as mentioned above, only one lamp lighting unit is required as in the case of a single-lamp device, and therefore the whole space of the back light is reduced.

The fluorescent lamp of each of these shapes includes a luminous tube of a shape formed by being turned up at a coupling or a bending part in the same plane.

Furthermore, a fluorescent lamp such as a U-shaped one having two straight tube parts mutually connected through a bending part or a coupling in the same plane is installed as a back light on the back of the surface of the liquid crystal display plate not more than the size of A5-size page generally used with liquid crystal television. In this way, the length of discharge of the fluorescent lamp for unit area of the liquid crystal display screen and hence the luminance thereof is improved as compared with a single straight tube fluorescent lamp used as a back light. In addition, the luminance in the direction toward the display plate is rendered uniform by setting the center distance of the two straight tube parts to 0.3 to 0.7 times of the width of the liquid crystal display screen. What is more, if this distance is set to 0.4 to 0.6 times of the width of the screen, the luminance of the central part and edges of the liquid crystal display screen become almost equal to each other, thereby further improving the luminance unevenness on the surface of the liquid crystal display screen.

Now, an embodiment of the present invention will be explained with reference to the accompanying drawings.

[Embodiment 1]

A construction of a back light device using a U-shaped fluorescent lamp 3 as a back light for the 10-inch liquid crystal display plate is shown in FIG. 1. A reflector box 2 of a light guide measures 220 mm by 170 mm by 30 mm. The outer diameter of the tube used for the U-shaped lamp 3 is 15.5 mm. The length c of the U-shaped lamp 3 contained substantially in the reflector box 2 is determined from equation $$L \times a \times \pi \times d \times c \times b = A \times LG$$

where d is the tube diameter, L the average luminance of the lamp surface, a the coefficient of light utilization of the reflector box 2, b the transmission ratio of the diffusion plate 1 having the liquid crystal display plate arranged thereon, A the area of the upper surface of the light guide, and LG the necessary luminance of the light guide According to this embodiment, L is set to 15,000 nt, a 0.5, d 15.5 mm, b 0.9, A 37400 mm$^2$, and LG 4000 nt. Therefore, $$c = (37400 \times 3000)/(15000 \times 0.5 \times 15.5 \times \pi \times 0.9) = 455$$

Since the U shaped lamp is used, this figure is considered substantially as 420.

As a result, an actual measurement of 3500 nt is obtained as an average surface luminance of the light guide, which virtually coincides with the calculations.

In the case under consideration, the luminance unevenness, which may be defined the range from a maximum luminance divided by average luminance to a minimum luminance divided by the average luminance, is approximately 135% to 62%, which represents a considerably uniform flat light source.

A milk-white acrylic plate is used as a diffusion plate. If another diffusion plate higher in diffusion effect is used (though with a reduced transmission ratio), on the other hand, the luminance unevenness is reduced at the sacrifice of average luminance.

An aluminum plate is used for the reflector box 2, and the interior surface thereof coated with the lacquer paint white available on the market.

The lamp lighting unit includes a two-transistor push-pull inverter circuit with the lamp wattage of 8 watts. Also, a three-band RGB fluorescent lamp 5000K in color temperature is used.

According to the present embodiment, a fluorescent lamp is lighted with a single lighting circuit, so that regardless of the increase in the size of the liquid crystal display screen, the surface luminance of the light guide is improved while reducing the luminance unevenness at the same time without changing the thickness of the back light. Further, the replacement of the lamp is facilitated by providing a lamp input terminal only on one side.

In addition, if the jig 4 for fixing the lamp has a part thereof higher in reflectivity inside the reflector box, it is possible to improve the luminance even by several percent.

[Embodiment 2]

Figure 2A:
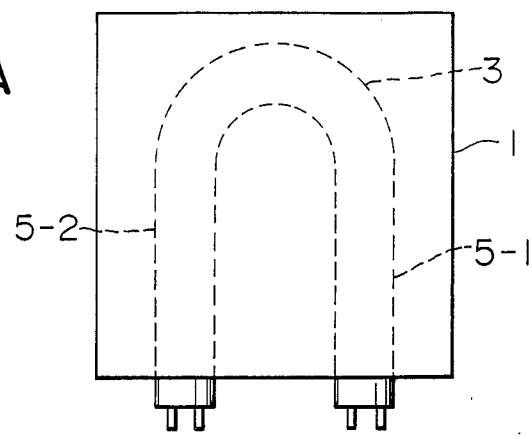
FIGS. 2A and 2B are a plan view and a front view respectively of an embodiment of the present invention.
Figure 2B:
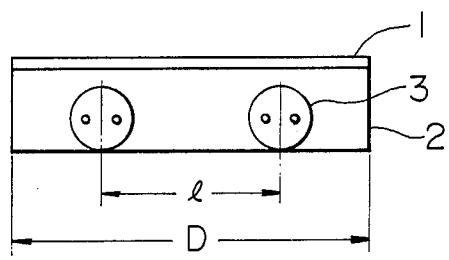
Figure 3:
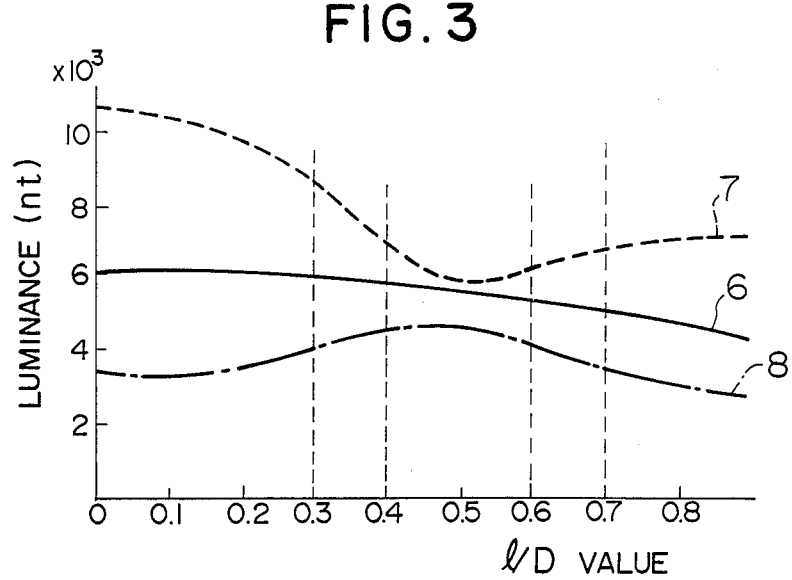
FIG. 3 is a diagram showing a change in luminance against the ratio between the center distance of fluorescent lamps and the width of the liquid display plate surface.

A liquid crystal display device with a fluorescent lamp according to another embodiment of the invention is shown in FIGS. 2A and 2B, of which FIG. 2A is a plan view, and FIG. 2B a front view. FIG. 3 is a diagram showing a change in luminance against the ratio between the center distance of the fluorescent lamp and the width of display screen. In FIGS. 2A and 2B, a fluorescent lamp 3 having two straight tube parts 5-1 and 5-2 12 mm in diameter parallel to each other and connected mutually at a bending part in the same plane is provided backward of a diffused plate made of acrylic resin 2 mm in thickness. At the rear of the diffused plate 1, a box is formed by reflection plates 2 of which inner surface is provided with a reflection membrane, thus covering the back of the fluorescent lamp 3, to constitute a display device. Upon lighting of the fluorescent lamp 3 built in the display device, the light entering directly the diffusion plate 1 from the fluorescent lamp 1 is mixed with the light reflected on the reflector 2 and enter the diffusion plate thereby to form the surface luminance of the diffused plate 1.

As shown in FIG. 2B, assume that l is the center distance of the fluorescent lamp 3, and D the width of the diffusion plate perpendicular to the center axis along the center distance. A graph plotting l/D on the abscissa and the luminance measurement taken along the direction perpendicular to the surface of the diffusion plate 1 on the ordinate is shown in FIG. 3. The surface of the diffusion plate 1, on which a liquid crystal display plate may be arranged, is regarded as a display surface, and the luminance thereof is indicated by the ordinate of FIG. 3. In FIG. 3, the average luminance of the display surface, as shown by the curve 6, decreases with the increase in the value l/D, that is, the center distance. The maximum luminance of the display surface, on the other hand, takes a minimum value when the value l/D is 0.5 as shown by the curve 7, while the minimum luminance of the display surface becomes maximum when the value l/D is 0.5 as shown by the curve 8. The surface luminance unevenness for the value l/D of 0.5 is $+5$ to $-20\%$. On an actual liquid crystal display screen, a luminance unevenness up to about $+30\%$ is allowable for practical applications. This luminance unevenness is associated with the value l/D of 0.3 to 0.7, beyond which some luminance unevenness is observed. The abovementioned range of luminance unevenness, however, may be considered a practically applicable one. If a more uniform luminance is required, by contrast, the luminance unevenness is preferably less than $+25\%$, which is realized by setting the value l/D to 0.4 to 0.6.

Instead of the tube of the fluorescent lamp 12 mm in diameter used above, a larger tube of, say, 15 mm may be used if the display screen is larger or as wide as the B5-size page.

It will thus be understood from the foregoing description that according to the present invention there is provided a liquid crystal display device comprising a fluorescent lamp having two straight tube parts connected to each other at a bending part or a coupling in the same plane and arranged backward of a display screen plate, wherein the relations $0.3 \leq l/D \leq 0.7$ is satisfied where l is the center distance of the two straight tube parts and D the width of the display plate along the direction perpendicular to the center axes. In this way, a display device with a fluorescent lamp comprising a fewer parts with an improved luminance of the display plate surface and a reduced luminance unevenness is realized without using any shade plate for removing the luminance unevenness which might reduce the luminance on the display plate.

We claim:

1. A back light device for liquid crystal display comprising:
   a liquid crystal display plate having a substantially rectangular shape,
   a light source for illuminating the liquid crystal display plate and comprising a fluorescent lamp in the form of a tube and two base terminal sections, one connected to each end of the fluorescent tube, said two base terminal sections being located at one side beyond the periphery of the liquid crystal display plate,
   a diffusion plate interposed between the liquid crystal display plate and the fluorescent lamp, and
   a reflector for reflecting light radiated from the fluorescent lamp toward the diffusion plate.

2. A back light device for liquid crystal display according to claim 1, wherein a length of said fluorescent lamp tube is in contact with a surface of the reflector.

3. A back light device for liquid crystal display according to claim 1, wherein said fluorescent lamp includes two straight tubular sections which are interconnected by a curved tubular section.

4. A back light device for liquid crystal display according to claim 3, wherein said fluorescent lamp has a U-shape.

5. A back light device for liquid crystal display according to claim 3, wherein the two straight sections have parallel center axes separated by a distance l, the terminal sections of the lamp tube are located in a plane generally perpendicular to a width dimension D of said display plate as measured in a direction perpendicular to said center axes, and wherein the distance l and the width dimension D have the following relationship: $0.3 < l/D < 0.7$.

6. A back light device for liquid crystal display according to claim 5, wherein the rate l/D is between 0.4 and 0.6.

7. A back light device for liquid crystal display according to claim 1, wherein the light source consists solely of a single fluorescent lamp tube having a single pair of terminals.

8. A back light device for liquid crystal display according to claim 7, wherein the single lamp tube includes two straight sections having generally parallel center axes separated by a distance l, the terminals for the tube lie in a side wall of a reflector box that lies in a plane generally perpendicular to a width dimension D of said display plate as measured in a direction perpendicular to said center axis, and wherein the distance M and the width dimension D have the following relationship: $0.3 < l/D < 0.7$.

* * * * *